United States Patent
Schwartzbart et al.

[15] 3,684,239
[45] Aug. 15, 1972

[54] BUTTERFLY TYPE VALVE WITH STRESS SEAL

[72] Inventors: Harry Schwartzbart; Robert Albert Douty, both of Pittsburgh, Pa.

[73] Assignee: Rockwell Manufacturing Company, Pittsburgh, Pa.

[22] Filed: Nov. 30, 1970

[21] Appl. No.: 93,651

[52] U.S. Cl. .................................251/173, 251/307
[51] Int. Cl. ..............................................F16k 5/16
[58] Field of Search.............................251/173, 307

[56] References Cited

UNITED STATES PATENTS

| 2,707,614 | 5/1955 | Saar | 251/173 |
| 3,190,610 | 6/1965 | Dingus | 251/173 |
| 2,673,708 | 3/1954 | Danks | 251/173 |
| 3,078,069 | 2/1963 | Broadbent | 251/173 |
| 3,414,234 | 12/1968 | Henrion | 251/173 |

*Primary Examiner*—Harold W. Weakley
*Attorney*—Strauch, Nolan, Neale, Nies & Kurz

[57] ABSTRACT

A butterfly valve assembly wherein metal body has an annular seat member, peripherally engaged by a rotatable disc in valve closed position, the seat member is an annular metal band having thickened ends welded to the body providing a continuous pressure tight annular space between the band and the body, and fluid pressure preferably higher than line pressure is introduced into that space when the valve is closed for stressing the seat band to sealingly engage the disc.

6 Claims, 4 Drawing Figures

INVENTORS
HARRY SCHWARTZBART
ROBERT ALBERT DOUTY

BY Strauch, Nolan, Neale, Nerd & Kurz
ATTORNEYS

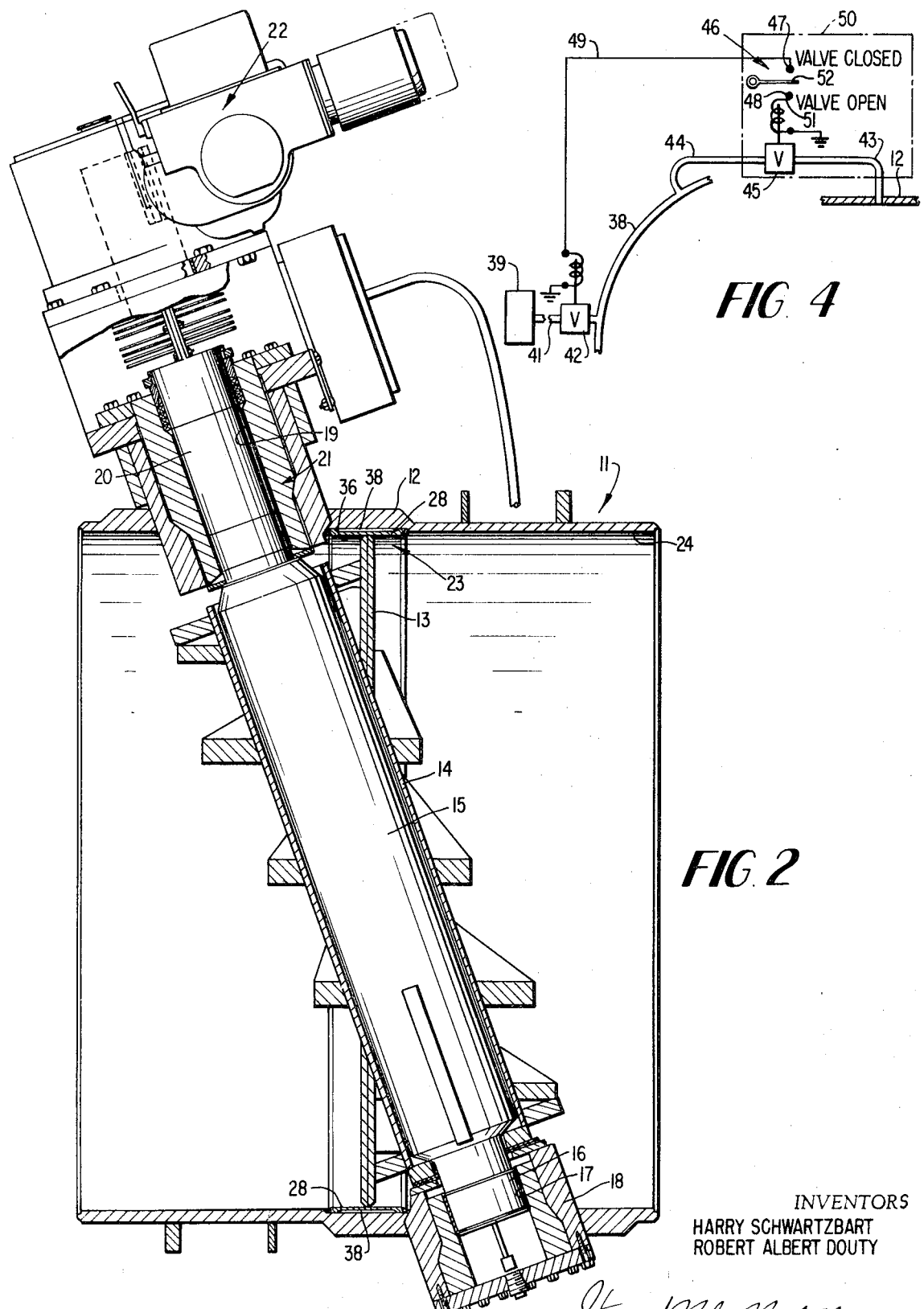

BUTTERFLY TYPE VALVE WITH STRESS SEAL

This invention relates to butterfly type valves, and particularly to such valves of relatively large sizes that are adapted for use in controlling the flow of relatively high temperature fluids.

More specifically the invention contemplates a novel mode of peripherally sealing the disc of a butterfly type valve in closed position.

Throughout the history of development of valves of this type sealing problems have been present and many proposed solutions have been offered. These include the provision of resilient and pressurized seats, special materials of varying characteristics, and special mechanical arrangements controlling the movement of the disc to engage the body seat.

While many of these prior proposals have proved adequate for certain conditions of service, none have provided universal solution of all problems, and in fact none are known that produce a satisfactory seal under the extreme conditions faced in making the present invention. The valve of the invention is peculiarly adapted for high temperature, high pressure gas service such as is encountered in jet engine and turbine testing. The particular valve structure to be disclosed herein as a preferred embodiment is intended for use in a 84 inch diameter pipe line section wherein hot gas at temperatures in excess of 1,000° F. are passed at pressures up to about 350 pounds per square inch. In valves of this magnitude and under such extreme conditions predictable and unpredictable stresses are encountered during changes in temperature and/or pressure and maintenance of the seal in the closed valve is a major problem.

The invention provides a novel valve structure which though mechanically simple to reduce the complexity of pressure and temperature induced stresses is effective to provide the required seal. More specifically it provides a novel pressurized stress seal around the disc periphery, and the foregoing is the major object of the invention.

It is another object of the invention to provide a novel butterfly type valve structure wherein a rotatably mounted disc seats peripherally on a continuous annular metal seat member secured within the body and controlled high fluid pressure is provided in an annular continuous space between the periphery of said member and said body when the valve is closed.

A further object of the invention is to provide a novel butterfly type valve wherein the valve seat within a stainless steel body is a continuous band of stainless steel, preferably of uniform thickness between thicker annular end regions and having about the same coefficient of expansion as the body, secured as by welding around the opposite end regions within the body, and fluid under a pressure higher than line pressure is selectively supplied to a continuous annular space between the periphery of said band of the body. A further attendant object of the invention resides in a novel mode of control of the fluid pressure in the space between the band and the body.

Further and more specific objects of the invention will appear as the description proceeds in connection with the appended claims and the annexed drawings.

BRIEF DESCRIPTION OF DRAWINGS

FIG. 2 is a side elevation mainly in section through the assembly of FIG. 1;

FIG. 4 is a diagrammatic view showing control of fluid pressure in the stress seal.

PREFERRED EMBODIMENTS

Figures 1, 3:
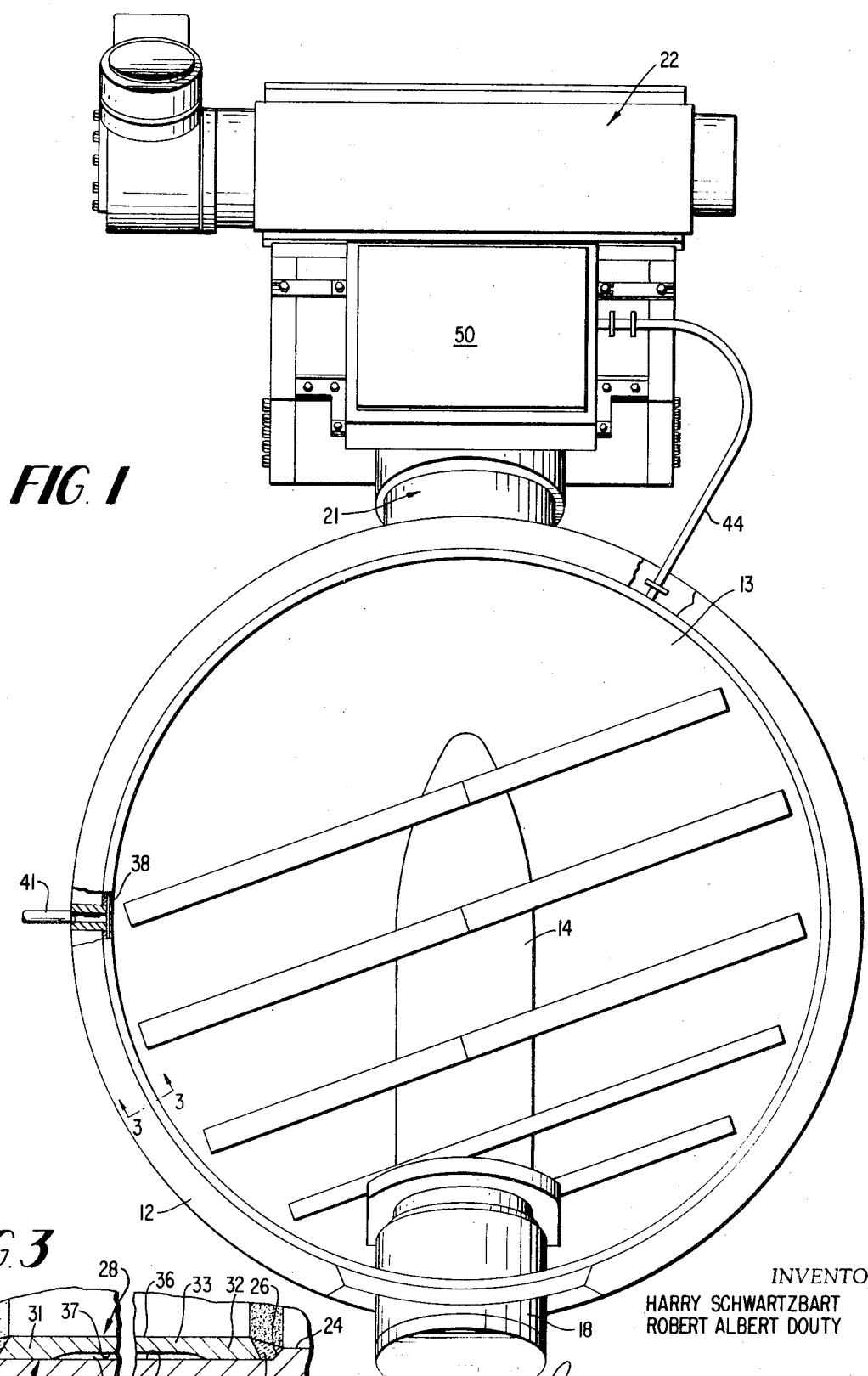
FIG. 1 is an end elevational showing a butterfly type valve assembly having a stress seal according to a preferred embodiment of the invention.
FIG. 3 is an enlarged fragmentary section substantially at line 3—3 in FIG. 1 showing detail of the seal.

FIGS. 1 and 2 illustrate a butterfly valve assembly 11 wherein a tubular metal body 12 contains a rotatable valve closure disc 13 that is movable between a fully closed position as shown wherein it is disposed across the fluid passageway through body 12 and a 90° displaced fully open position wherein it is aligned with a diameter of body 12. At its opposite ends body 12 is adapted to be mounted within a pipeline of the same internal diameter in a known manner.

In the illustrated embodiment, disc 13 has a hollow hub 14 rigidly mounting it on a shaft 15 that is mounted for rotation about an axis that extends transversely of body 12, at an angle to a diameter as shown in FIG. 2. One reduced diameter end 16 of shaft 15 is journaled at 17 in a collar 18 rigid with body 12. The other reduced diameter end 20 of shaft 15 is journaled at 19 in a collar assembly 21 rigid with body 12, and extends into an operator unit 22.

Shaft 15 is suitably sealed at both ends to prevent escape of pipeline pressure therealong from the interior of body 12. The operator unit 22 may be of any suitable type, electrically or hydraulically actuated, connected to rock shaft 15 and therefore disc 13 between 90° apart fully open and fully closed positions.

The foregoing structure may be more or less conventional, and it does not contain detail forming per se part of the invention.

The invention is concerned essentially with the provision of a stress seal at the periphery of valve disc 13, the seal region being indicated at 23 in FIG. 2 and shown enlarged in FIG. 3.

Tubular body 12 is internally cylindrical at 24 to provide a uniform diameter passageway. At seal region 23 the internal surface of the body is formed with a relatively shallow continuous annular groove 26 the bottom surface 27 of which is a cylinder concentric with mount surface 24.

A continuous graded thickness uniform width cylindrical band 28 of suitable metal is permanently mounted in groove 26. As shown in FIG. 3, band 28 has opposite axially spaced continuous annular end sections 31 and 32 that are thicker than the intermediate uniform thickness band section 33. This difference in thickness is preferably provided by external integral continuous ribs at 31 and 32, and these ribs seat on the bottom of groove 26 near opposite ends of the groove.

Band 28 is permanently secured to body 12 within groove 26 by parallel annular end welds 34 and 35 that extend continuously therearound. The inner cylindrical periphery of band 28 is a smooth cylindrical surface 36 concentric with surface 24, but of slightly less diameter than surface 24. The inner surfaces of the weld seams at 34, 35 merge smoothly between surfaces 24 and 36. The outer cylindrical surface 37 of band 28 is also preferably concentric with surface 24.

As a result when band 28 has been welded into place as shown, there is provided at seat region 23 a cylindrical valve seat surface 36 backed by a continuous relatively shallow annular space 38 of substantially uniform thickness all the way around.

In the assembly, when disc 13 is rotated to valve closed position, the circular outer periphery of disc 13 engages seat 36 in a continuous annular zone of metal to metal contact about midway between its ends. Preferably the outer diameter of disc 13 is such as to have sliding metal to metal contact with seat surface 36 when there is no stress pressure in space 38.

The invention includes means to control the fluid pressure within space 38 to stress the surface 36 about the disc periphery, for optimum sealing when the valve is closed, with provision for relaxing the fluid pressure when the valve is open or being opened.

This is diagrammatically illustrated in FIG. 4 wherein the annular space 38 is shown connected to an external source of fluid pressure 39 that is independent of pipe line pressure by a conduit 41 containing a normally closed solenoid valve unit 42. Space 38 is connected to the interior of body 12, preferably downstream of disc 13, by a passage 43 which has a conduit section 44 and contains a normally closed solenoid valve unit 45.

A switch assembly 46 comprises spaced terminals 47 and 48 connected by conductors 49 and 51 to the solenoids at 42 and 45 respectively, and a switch arm 52 operated by the actuator to turn in predetermined synchronism with shaft 15. Switch arm 52 is connected to one side of an electrical line and adapted to be swung between contact with terminal 47 whereby it energizes valve 42 to open position, and contact with terminal 48 whereby it energizes valve 45 to open position.

Thus, when the valve disc 13 is in fully closed position, solenoid valve 45 is closed and solenoid valve 42 is open to pressurize space 38. The timing is preferably such that, during valve closing, arm 52 which has been disengaged from terminal 48 so that passage 43 is closed, engages terminal 47 to cause solenoid valve 42 to open just after disc 13 has reached desired seating engagement with surface 36 and is disposed in fully closed position across the passageway at right angles to fluid flow.

Similarly when valve disc 13 is in fully open position solenoid valve 42 is closed, and solenoid valve 45 is open to admit line pressure to space 38, thereby providing pressure equalization at line pressure at both sides of the seat. The timing is such that, during valve opening, arm 52 which first disengages from terminal 47 to close solenoid valve 42 engages terminal 48 to cause valve 45 to open before disc 13 starts to move toward open position.

Selection of the metallic compositions of both the body 12 and seat band 28 are important phases of the invention. Both must be structurally strong and resistant to corrosion and otherwise inert with respect to the fluid being valved, and the two must be physically compatible during valve operation. For example, in a specific embodiment both the body and seat band are austenitic stainless steels. The body may be formed of wrought stainless steel, ASI Type 316. The band 28 may be a length of cold rolled ASI Type 216 which is a relatively low nickel stainless steel. These alloys have similar coefficients of expansion, they have relatively high yield strengths relative to the service loads at the high temperatures encountered, they may be readily welded together along the continuous seams 34 and 35, and they undergo little relative movement due to temperature changes. Similarly the disc 13 may preferably be of a metal having about the same coefficient of expansion as the body, so that upon changes in line fluid temperature the body and disc will expand or contract together to tend to maintain a substantially constant annular gap between the disc and the unstressed band. While the seat stress pressure delivered to space 38 when the valve is closed is sufficient to cause the relatively resilient seat to more closely engage the disc periphery, it is not high enough to cause any appreciable distortion of the valve body.

In a useful embodiment wherein the body 12 has an internal diameter of 84 inches at surface 24, the seal band 28 is about ten inches in axial length with an intermediate section thickness of about one-fourth of an inch at 33 and thicker end section edge ribs 31 and 32 each about three-eights of an inch thick and about seven-eights of an inch in axial length where they seat on the bottom of groove 26. This provides a continuous space or chamber 38 about one-tenth to one-eight of an inch in radial thickness. Space 38 is entirely sealed pressure tight except for the passage connections controlled by solenoid valves 42 and 45.

Since the coefficient of expansion of the band metal is similar to that of the body the weld seams are not appreciably stressed when the valve is passing hot fluids.

In practice the valve of the invention may be inserted in an air line in connection with jet engine and turbine tests. In a system wherein the line pressure is about 180 pounds per square inch, it is contemplated to pressurize space 38 materially higher, as up to about 275 to 350 bounds per square inch. Source 39 may be capable of delivering nitrogen at the desired pressure. Nitrogen is cleaner than air and may be preferred for that reason. Part of passage 43, valve 45 and switch 46 may be enclosed in a receptacle 50 mounted on the operator unit.

By using an independent external source of pressure for the stress seal, the accumulation and deposit of foreign particles in space 38 may be avoided.

In operation when the valve is closed with disc 13 peripherally engaging seat surface 36 and space 38 pressurized from source 39 the resultant stress seal around the disc is efficient and will be maintained even at very high temperatures. Under pressure, section 33 of band 28 will expand in the direction of the periphery of disc 13 and closely conform to the engaged periphery of disc 13, thereby aiding in preventing line pressure from turning the disc as well as providing the desired seal. Actually internal pressure will cause the band to bow toward the disc, and this may result in the band assuming annular inwardly bowed regions on opposite sides of its annulus of contact with the disc.

The action of switch arm 52 in automatically establishing the high stress pressure in space 38 when the valve is closed and the lower equalizing line pressure in space 38 for valve opening is synchronized with the action of operator 22 in turning shaft 22.

The invention may be embodied in other specific forms without departing from the spirit of essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In a butterfly type valve assembly for handling high temperature fluids, a metal body having a large diameter continuous annular internal groove of constant width, means rotatably mounting a closure disk within said body, means providing a continuous annular metal valve seat member within the body adapted for peripheral engagement with said disk in the valve closed position, and providing a substantially continuous annular space between said seat member and the body, and means for introducing fluid under pressure into said space to stress said seat member about the periphery of said disk to provide a fluid tight seal, said valve seat member consisting of a continuous uniform width band having thickened opposite ends forming parallel external ribs projecting around its outer periphery and welded to said body within said groove.

2. In the valve defined in claim 1, said body and seat member being metals having similar coefficients of expansion.

3. In the valve defined in claim 2, said body and seat members being composed of similar stainless steels.

4. In the valve defined in claim 1, the pressure in said space being appreciably higher than the line pressure within said body when the valve is closed.

5. In the valve defined in claim 4, first valve means controlling fluid communication between an external source of fluid pressure and said space, and means synchronized with movement of the valve closure member for opening said first valve means when the closure member is in valve closed position engagement with said seat member.

6. In the valve defined in claim 5, second valve means controlling fluid communication in a passage between said space and the interior of said body, and means synchronized with movement of said valve closure member for opening said second valve means when said valve closure member is in valve open position, while closing said first valve means when said space is in open communication with the interior of said valve body.

* * * * *